(12) United States Patent
Juan et al.

(10) Patent No.: US 12,493,698 B2
(45) Date of Patent: Dec. 9, 2025

(54) SCAN CHAIN CIRCUIT AND OPERATION METHOD THEREOF

(71) Applicant: MACRONIX INTERNATIONAL CO., LTD., Hsinchu (TW)

(72) Inventors: Shih-Chou Juan, Taoyuan (TW); Shao-Yu Wang, New Taipei (TW); Min-Zhi Ji, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 95 days.

(21) Appl. No.: 18/650,353

(22) Filed: Apr. 30, 2024

(65) Prior Publication Data

US 2025/0335591 A1 Oct. 30, 2025

(51) Int. Cl.
*G06F 21/56* (2013.01)

(52) U.S. Cl.
CPC ...... *G06F 21/567* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 7,793,180 B1 * | 9/2010 | Shrivastava | ... G01R 31/318541 714/726 |
| 9,459,319 B2 | 10/2016 | Chen et al. | |
| 10,038,428 B2 | 7/2018 | Hwang et al. | |
| 2003/0070128 A1 * | 4/2003 | Akasaka | ........ G01R 31/318544 326/62 |
| 2008/0209288 A1 * | 8/2008 | Burlison | ........ G01R 31/318544 714/726 |
| 2012/0317450 A1 * | 12/2012 | Miura | ............ G01R 31/318536 714/E11.155 |
| 2021/0098057 A1 | 4/2021 | Jung et al. | |

FOREIGN PATENT DOCUMENTS

| | | |
|---|---|---|
| TW | 201504651 A | 2/2015 |
| TW | 201711027 A | 3/2017 |
| TW | 202121412 A | 6/2021 |

* cited by examiner

*Primary Examiner* — Anh Q Tran
(74) *Attorney, Agent, or Firm* — McClure, Qualey & Rodack, LLP

(57) ABSTRACT

A scan chain circuit and an operation method thereof are provided. The scan chain circuit includes a plurality of scan chain units. Each of the scan chain units includes a plurality of input scan flip-flop (SFF) and a comparison circuit. After a plurality of input bit values are operated by a logic circuit, a plurality of actual operation result bit values are obtained. The comparison circuit is used to receive the actual operation result bit values and a plurality of predetermined operation result bit values. Each of the predetermined operation result bit values is each of a plurality of predetermined operation results after each of the input bit values is operated by the logic circuit. The comparison circuit compares the actual operation bit values and the predetermined operation result bit values, and then outputs a bits comparison result bit value.

20 Claims, 12 Drawing Sheets

SCAN CHAIN CIRCUIT AND OPERATION METHOD THEREOF

TECHNICAL FIELD

The disclosure relates in general to a circuit and an operation method thereof, and more particularly to a scan chain circuit and an operation method thereof.

BACKGROUND

In order to ensure the function of the chip, a scan chain is designed in the chip to perform functional testing of the chip. Although the scan chain increases the testability of the chip, the security is decreased.

Hackers may retrieve data through the scan chain. For example, a hacker may analyze the output data in a test mode and deduce the design of the logic circuit. Or, the hacker may switch between a user mode and the test mode to steal data used in the user mode.

In order to avoid hacker attacks, researchers are working on improving the scan chain circuit to improve data security.

SUMMARY

The disclosure is directed to a scan chain circuit and an operation method thereof. A comparison circuit and a golden scan flip-flop (Golden SFF) (or a checker scan flip-flop (Checker SFF)) are used, such that a scan chain unit does not directly output actual operation result bit values, but outputs a bits comparison result bit value or an individual comparison result bit value after internal comparison. In this way, even if a hacker steals the bits comparison result bit value or the individual comparison result bit value, the contents of the logic circuit cannot be deduced, nor can any user information be obtained.

According to one embodiment, a scan chain circuit is provided. The scan chain circuit is used for testing a logic circuit. The scan chain circuit includes a plurality of scan chain units. Each of the scan chain units includes a plurality of scan flip-flop (SFF) and a comparison circuit. The scan flip-flop (SFF) are used for receiving a plurality of input bit values. After the input bit values are operated by the logic circuit, a plurality of actual operation result bit values are obtained. The comparison circuit is used for receiving the actual operation result bit values and a plurality of predetermined operation result bit values. Each of the predetermined operation result bit values is each of a plurality of predetermined operation results after each of the input bit values is operated by the logic circuit. The comparison circuit compares the actual operation result bit values and the predetermined operation result bit values, and then outputs a bits comparison result bit value.

According to another embodiment, a scan chain circuit is provided. The scan chain circuit is used for testing a logic circuit. The scan chain circuit includes a plurality of scan chain units. Each of the scan chain units includes a plurality of input scan flip-flop (SFF) and at least one checker scan flip-flop (Checker SFF). The input scan flip-flops are used to receive a plurality of input bit values. After the input bit values are operated by the logic circuit, a plurality of actual operation result bit values are obtained. The at least one checker scan flip-flop is used for receiving the actual operation result bit values and a plurality of predetermined operation result bit values. Each of the predetermined operation result bit values is each of a plurality of predetermined operation results of each of the input bit values operated by the logic circuit. The at least one checker scan flip-flop compares the actual operation result bit values and the predetermined operation result bit values, and then outputs a plurality of individual comparison result bit values.

According to an alternative embodiment, an operation method of a scan chain circuit is provided. The operation method of the scan chain circuit includes: controlling the scan chain circuit to be enter a test mode; sequentially inputting a plurality of input bit values to a plurality of input ends of a plurality of input scan flip-flops (SFF); operating the input bit values by a logic circuit to obtain a plurality of actual operation result bit values at the output ends of the input scan flip-flops; inputting one of the actual operation result bit values to a comparison circuit; inputting one of a plurality of predetermined operation result bit values to the comparison circuit; and comparing the actual operation result bit value, which is inputted, with the predetermined operation result bit value, which is inputted, using the comparison circuit to obtain an individual comparison result bit value. Inputting one of the actual operation result bit values to the comparison circuit, inputting one of the predetermined operation result bit values to the comparison circuit, and comparing the actual operation result bit value, which is inputted, with the predetermined operation result bit value, which is inputted, using the comparison circuit are performed repeatedly.

Figure 1:
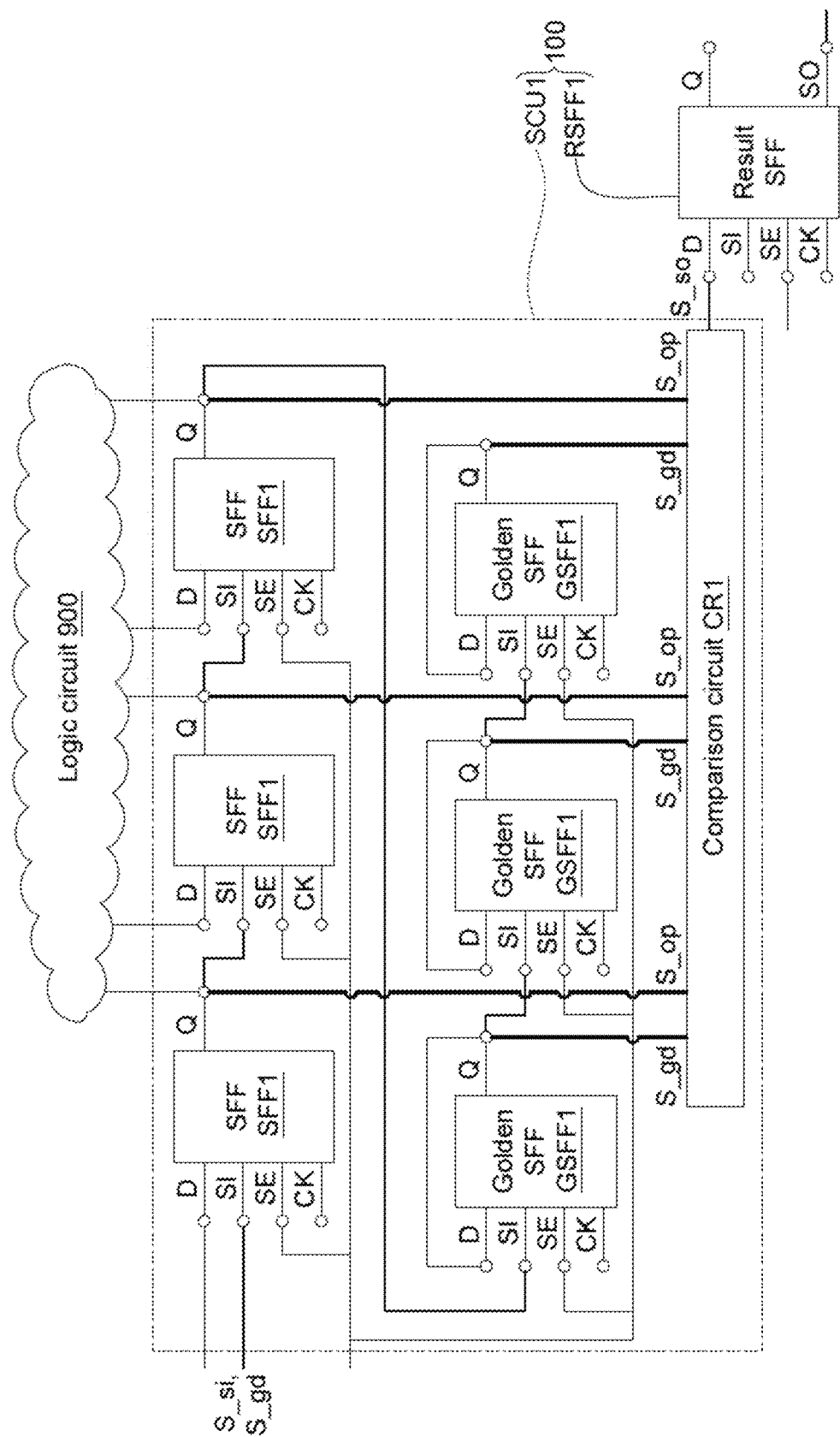
FIG. 1 illustrates a schematic diagram of a scan chain unit of a scan chain circuit according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

The technical terms used in this specification refer to the idioms in this technical field. If there are explanations or definitions for some terms in this specification, the explanation or definition of this part of the terms shall prevail. Each embodiment of the present disclosure has one or more technical features. To the extent possible, a person with ordinary skill in the art may selectively implement some or all of the technical features in any embodiment, or selectively combine some or all of the technical features in these embodiments.

Please refer to FIG. 1, which illustrates a schematic diagram of a scan chain unit SCU1 of a scan chain circuit 100 according to an embodiment of the present disclosure. The scan chain circuit 100 is used to test a logic circuit 900. The scan chain circuit 100 includes one or more scan chain units SCU1 and one or more result scan flip-flops (Result SFF) RSFF1. The FIG. 1 only shows one scan chain unit SCU1 and one result scan flip-flop RSFF1.

As shown in the FIG. 1, each of the scan chain units SCU1 includes a plurality of input scan flip-flops (SFF) SFF1, a plurality of golden scan flip-flops (Golden SFF) GSFF1 and a comparison circuit CR1. In the embodiment in the FIG. 1, the number of the golden scan flip-flops GSFF1 is the same as the number of the input scan flip-flops SFF1.

Figure 2:
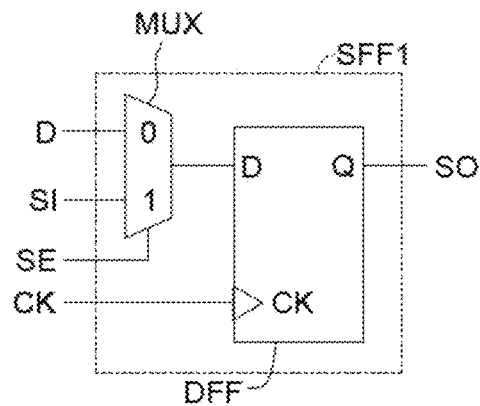
FIG. 2 illustrates a schematic diagram of an input scan flip-flop according to an embodiment of the present disclosure.

Please refer to FIG. 2, which illustrates a schematic diagram of the input scan flip-flop SFF1 according to an embodiment of the present disclosure. The input scan flip-flop SFF1 includes a D-type flip-flop DFF and a multiplexer MUX. The D-type flip-flop DFF has an input end D, a clock receiving end CK and an output end Q. The input end D of the D-type flip-flop DFF is connected to the multiplexer MUX. The multiplexer MUX selects the input end D or the input end SI to receive signals through a select end SE.

The circuit structure of each of the golden scan flip-flops GSFF1 is the same as that of each of the input scan flip-flops SFF1, and will not be described again here.

As shown in the FIG. 1, the input scan flip-flops SFF1 are connected in series. That is to say, the output end Q of the previous input scan flip-flop SFF1 is connected to the input end SI of the next input scan flip-flop SFF1. The input ends D of the input scan flip-flops SFF1 are connected to the logic circuit 900.

The golden scan flip-flops GSFF1 are concatenated in series. That is to say, the output end Q of the previous golden scan flip-flop GSFF1 is connected to the input end SI of the next golden scan flip-flop GSFF1.

The golden scan flip-flops GSFF1 are concatenated behind the input scan flip-flops SFF1. That is to say, the output end Q of the last input scan flip-flop SFF1 is connected to the input end SI of the first golden scan flip-flop GSFF1.

As shown in the FIG. 1, three predetermined operation result bit values S_gd and three input bit values S_si are inputted sequentially from the input end SI of the first input scan flip-flop SFF1. After six rising-edge-triggers of the clock signal CLK (shown in FIG. 4), the three predetermined operation result bit values S_gd and the three input bit values S_si will be pushed into the three golden scan flip-flops GSFF1 and the three input scan flip-flops SFF1 respectively.

The input bit value S_si is, for example, "0" or "1". After the input bit values S_si are operated by the logic circuit 900, a plurality of actual operation result bit values S_op will be obtained at the output ends Q of the three input scan flip-flops SFF1.

Each of the predetermined operation result bit values S_gd is each of a plurality of predetermined operation results of each of the input bit values S_si after being operated by the logic circuit 900.

The output ends Q of the input scan flip-flops SFF1 and the output ends Q of the golden scan flip-flops GSFF1 are connected to the comparison circuit CR1. The comparison circuit CR1 could receive the actual operation result bit values S_op and the predetermined operation result bit values S_gd. The comparison circuit CR1 compares the actual operation result bit values S_op and the predetermined operation result bit values S_gd, then outputs a bits comparison result bit value S_so.

As shown in the FIG. 1, the comparison circuit CR1 simultaneously receives the actual operation result bit values S_op outputted from the output ends Q of the input scan flip-flops SFF1 and the predetermined operation result bit values S_gd outputted from the output ends Q of the golden scan flip-flops GSFF1, and then compares them at the same time.

The bits comparison result bit value is, for example, "0" or "1". "0" indicates that at least one of the actual operation result bit values S_op is different from the corresponding predetermined operation result bit value S_gd; "1" indicates that all of the actual operation result bit values S_op and the corresponding predetermined operation result bit values S_gd are the same.

Or, in another embodiment, the bits comparison result bit value is, for example, "1" or "0". "1" indicates that at least one of the actual operation result bit values S_op is different from the corresponding predetermined operation result bit value S_gd; "0" indicates that all of the actual operation result bit values S_op and the corresponding predetermined operation result bit values S_gd are the same.

In the embodiment shown in the FIG. 1, the scan chain unit SCU1 does not directly output the actual operation result bit values S_op, but outputs the bits comparison result bit value S_so after internal comparison. In this way, even if a hacker steals the bits comparison result bit value S_so, the contents of the logic circuit 900 cannot be deduced, nor can any user information be obtained.

Figure 3:
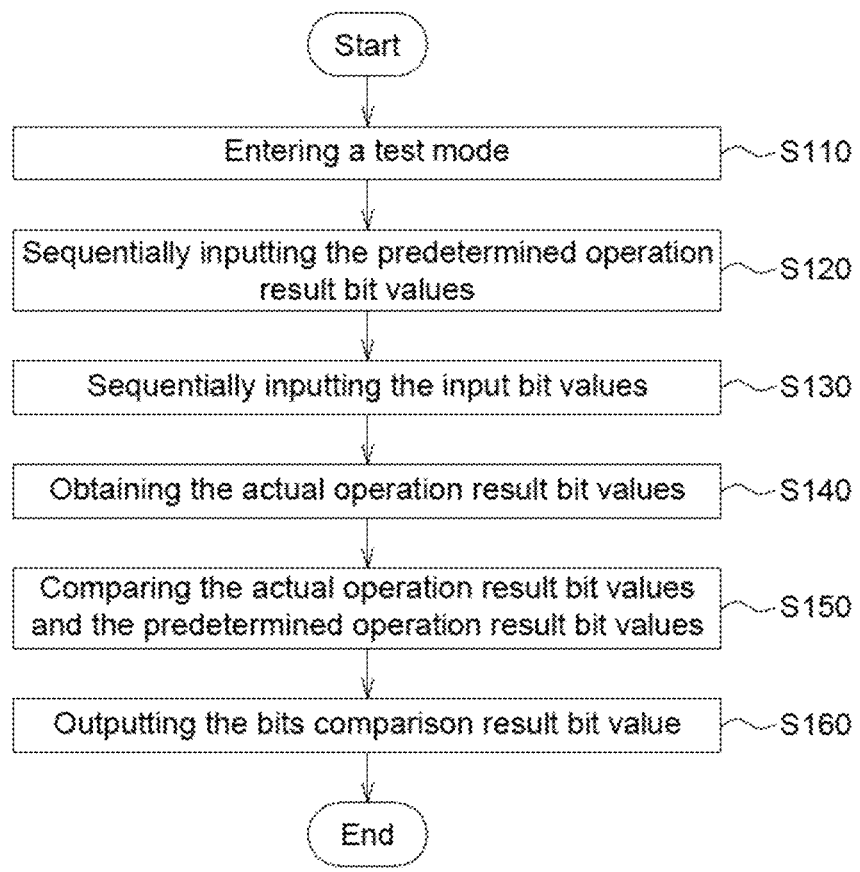
FIG. 3 illustrates a flow chart of the operation method of the scan chain circuit according to an embodiment of the present disclosure.
Figure 4:
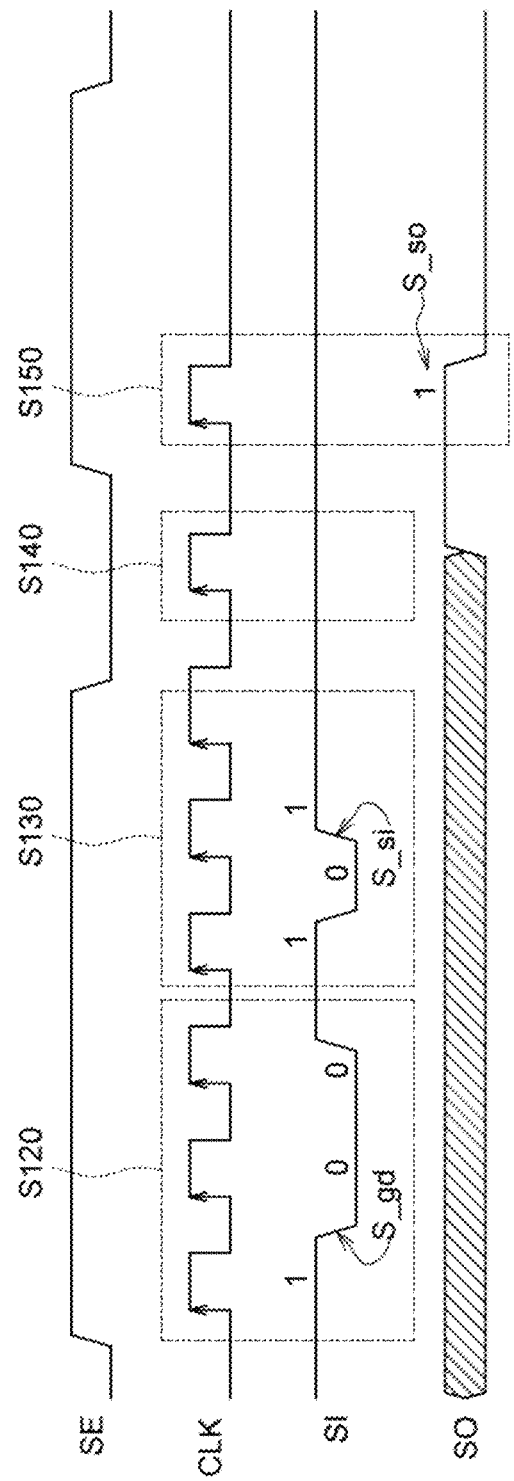
FIG. 4 shows a sequence diagram of the steps in FIG. 3.

Please refer to FIGS. 1, 3 and 4. FIG. 3 illustrates a flow chart of an operation method of the scan chain circuit 100 according to an embodiment of the present disclosure. FIG. 4 shows a sequence diagram of the steps in FIG. 3. The operation method of the scan chain circuit 100 includes steps S110 to S160. In the step S110, the scan chain circuit 100 is controlled to be entered a test mode.

Then, in the step S120, the predetermined operation result bit values S_gd are sequentially inputted to the scan chain unit SCU1. As shown in the FIG. 4, the three predetermined operation result bit values S_gd are, for example, "1", "0", and "0". At this time, the select ends SE are pulled up to a high voltage, so that the predetermined operation result bit values S_gd at the input ends SI could be inputted. After three rising-edge-triggers of the clock signal CLK, three predetermined operation result bit values S_gd will be pushed into the three input scan flip-flops SFF1.

Afterwards, in the step S130, the input bit values S_si are sequentially inputted to the scan chain unit SCU1. As shown in the FIG. 4, the three input bit values S_si are, for example, "1", "0", and "1". At this time, the select ends SE are pulled up to a high voltage, so that the input bit values S_si at the input end SI could be inputted. After three rising-edge-triggers of the clock signal CLK, the three input bit values S_si will be pushed into the three input scan flip-flops SFF1, and the three predetermined operation result bit values S_gd will be pushed into the three golden scan flip-flops GSFF1.

Next, in the step S140, the input bit values S_si are operated by the logic circuit 900 to obtain the actual operation result bit values S_op at the output ends Q of the input scan flip-flops SFF1. At this time, the select ends SE are pulled down, so that the logic circuit 900 connected to the input end D could perform the operation.

Then, in the step S150, the actual operation result bit values S_op and the predetermined operation result bit values S_gd are inputted to the comparison circuit CR1 for comparison.

Next, in the step S160, the comparison circuit CR1 outputs the bits comparison result bit value S_so at an output end SO. As shown in the FIG. 4, the bits comparison result bit value S_so is "1".

In the operation method of the scan chain circuit 100 in the embodiment shown in the FIG. 3, the actual operation result bit values S_op are not outputted directly, but after internal comparison, the bits comparison result bit value S_so of "1" or "0" is outputted. In this way, even if a hacker steals the bits comparison result bit value S_so, the contents of the logic circuit 900 cannot be deduced, nor can any user information be obtained.

Figure 5:
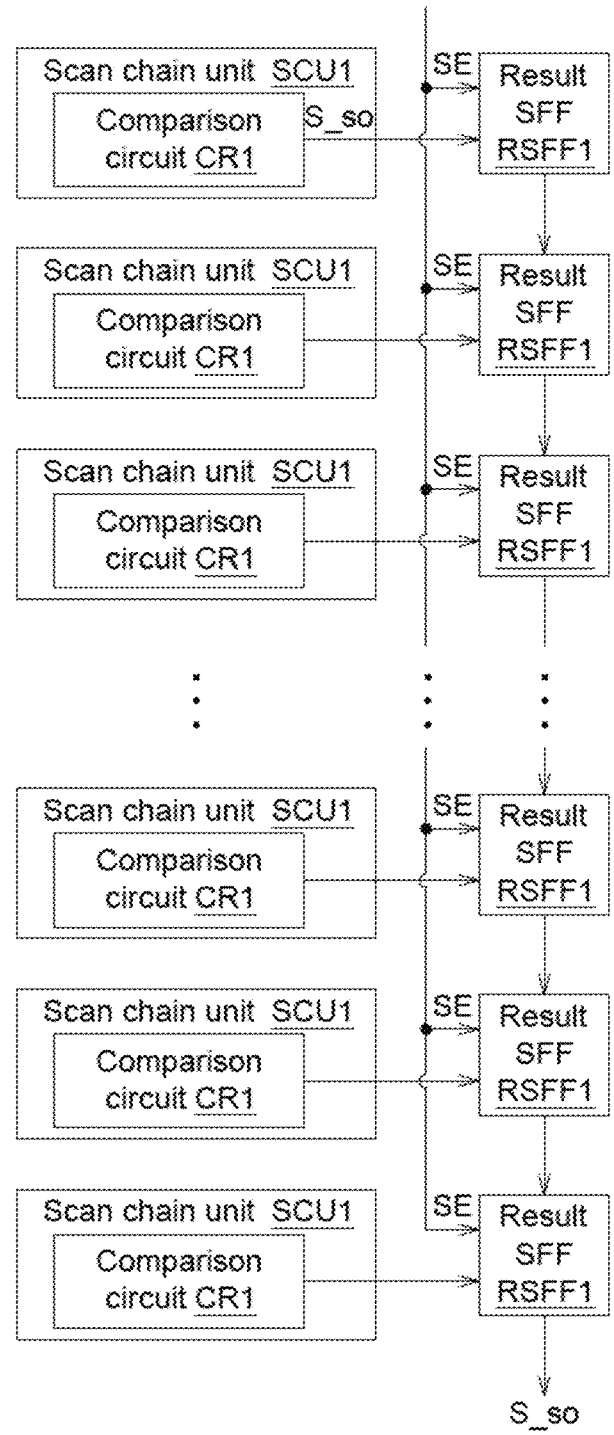
FIG. 5 illustrates a schematic diagram of the scan chain circuit according to an embodiment of the present disclosure.

The FIG. 1 only shows one scan chain unit SCU1 and one result scan flip-flop RSFF1. Please refer to FIG. 5, which illustrates a schematic diagram of the scan chain circuit 100 according to an embodiment of the present disclosure. The scan chain circuit 100 includes the aforementioned scan chain units SCU1 and the aforementioned result scan flip-flops RSFF1. The result scan flip-flops RSFF1 are respectively connected to the scan chain units SCU1. The result scan flip-flops RSFF1 are connected in series to output the bits comparison result bit values S_so in sequence. In the process of outputting the bits comparison result bit values S_so, the select ends SE are at a high voltage. Through the rising-edge-triggers of the clock signal CLK (shown in the FIG. 4), the bits comparison result bit values S_so will be pushed out sequentially.

Figure 6:
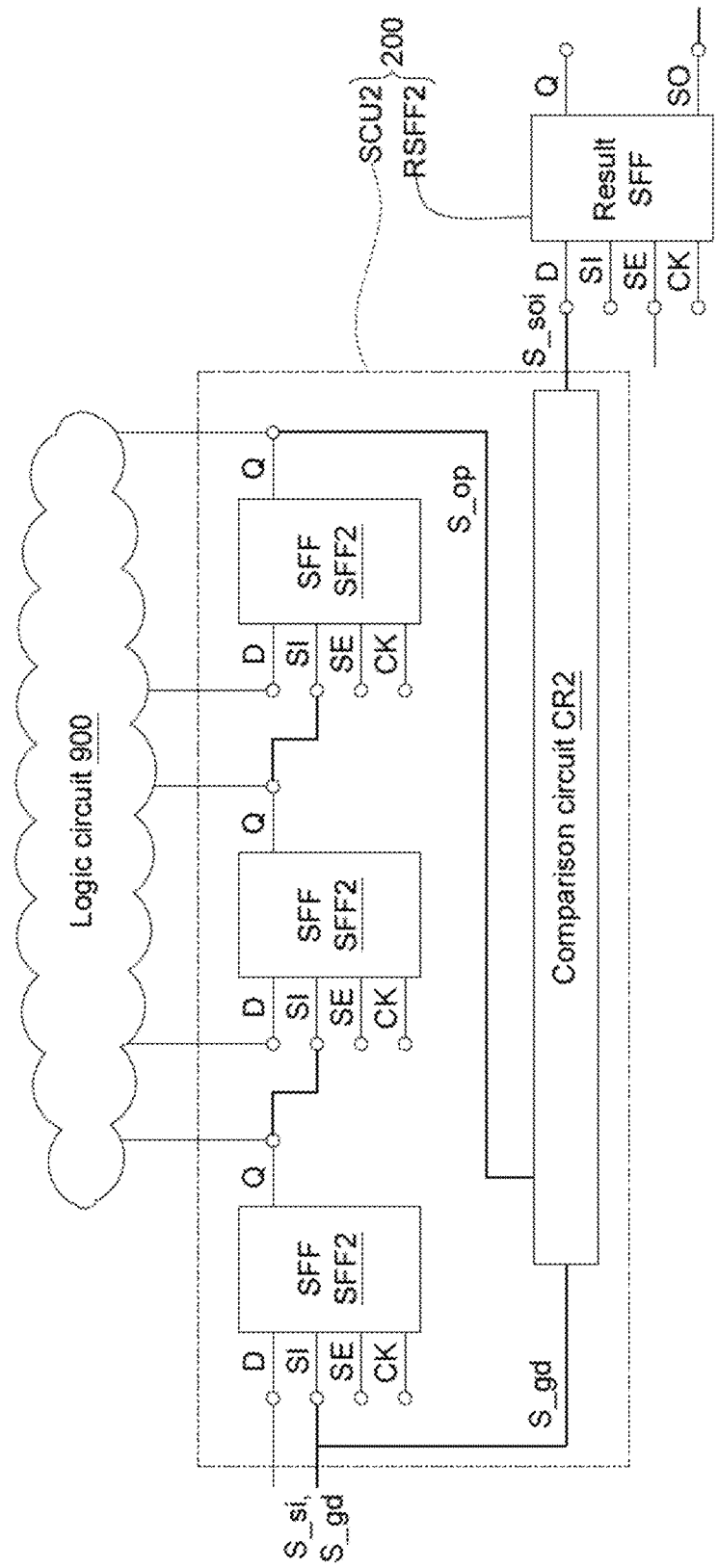
FIG. 6 illustrates a schematic diagram of a scan chain unit of a scan chain circuit according to another embodiment of the present disclosure.

Please refer to FIG. 6, which illustrates a schematic diagram of a scan chain unit SCU2 of a scan chain circuit 200 according to another embodiment of the present disclosure. The scan chain circuit 200 includes a plurality of scan chain units SCU2 and a plurality of result scan flip-flop (Result SFF) RSFF2. FIG. 6 only shows one scan chain unit SCU2 and one result scan flip-flop RSFF2. As shown in the FIG. 6, each of the scan chain units SCU2 includes a plurality of input scan flip-flops (SFF) SFF2 and a comparison circuit CR2. The circuit structure of the input scan flip-flop SFF2 is the same as that of the aforementioned input scan flip-flop SFF1, and will not be described again here.

As shown in FIG. 6, the input scan flip-flops SFF2 are connected in series. That is to say, the output end Q of the previous input scan flip-flop SFF2 is connected to the input end SI of the next input scan flip-flop SFF2. The input ends D of the input scan flip-flops SFF2 are connected to the logic circuit 900.

The output end Q of the last input scan flip-flop SFF2 is connected to the comparison circuit CR2. The input end SI of the first input scan flip-flop SFF2 is also connected to the comparison circuit CR2.

As shown in the FIG. 6, the three input bit values S_si are inputted sequentially from the input end SI of the first input scan flip-flop SFF2. After three rising-edge-triggers of the clock signal CLK, the three input bit values S_si will be pushed into the three input scan flip-flops SFF2 respectively.

The input bit value S_si is, for example, "0" or "1". After the input bit values S_si are operated by the logic circuit 900, a plurality of actual operation result bit values S_op will be obtained at the output ends Q of the three input scan flip-flops SFF2.

Then, three predetermined operation result bit values S_gd are inputted sequentially from the input end SI of the first input scan flip-flop SFF2. After three rising-edge-triggers of the clock signal CLK, the three predetermined operation result bit values S_gd will be pushed into the three input scan flip-flops SFF2 and the comparison circuit CR2 in sequence, and the three actual operation result bit values S_op will also be pushed from the three input scan flip-flops SFF2 to the comparison circuit CR2 in sequence.

As shown in FIG. 6, the comparison circuit CR2 sequentially receives the actual operation result bit values S_op outputted from the output end Q of the last input scan flip-flop SFF2 and the predetermined operation result bit values S_gd outputted from the input end SI of the first input scan flip-flop SFF2. After comparing the actual operation result bit values S_op and the predetermined operation result bit values S_gd through the comparison circuit CR2, the individual comparison result bit values S_soi can be outputted in sequence.

In the embodiment shown in the FIG. 6, the scan chain unit SCU2 does not directly output the actual operation result bit values S_op, but outputs the individual comparison result bit values S_soi after internal comparison. In this way, even if a hacker steals the individual comparison result bit values S_soi, the contents of the logic circuit 900 cannot be deduced, nor can any user information be obtained.

Figure 7:
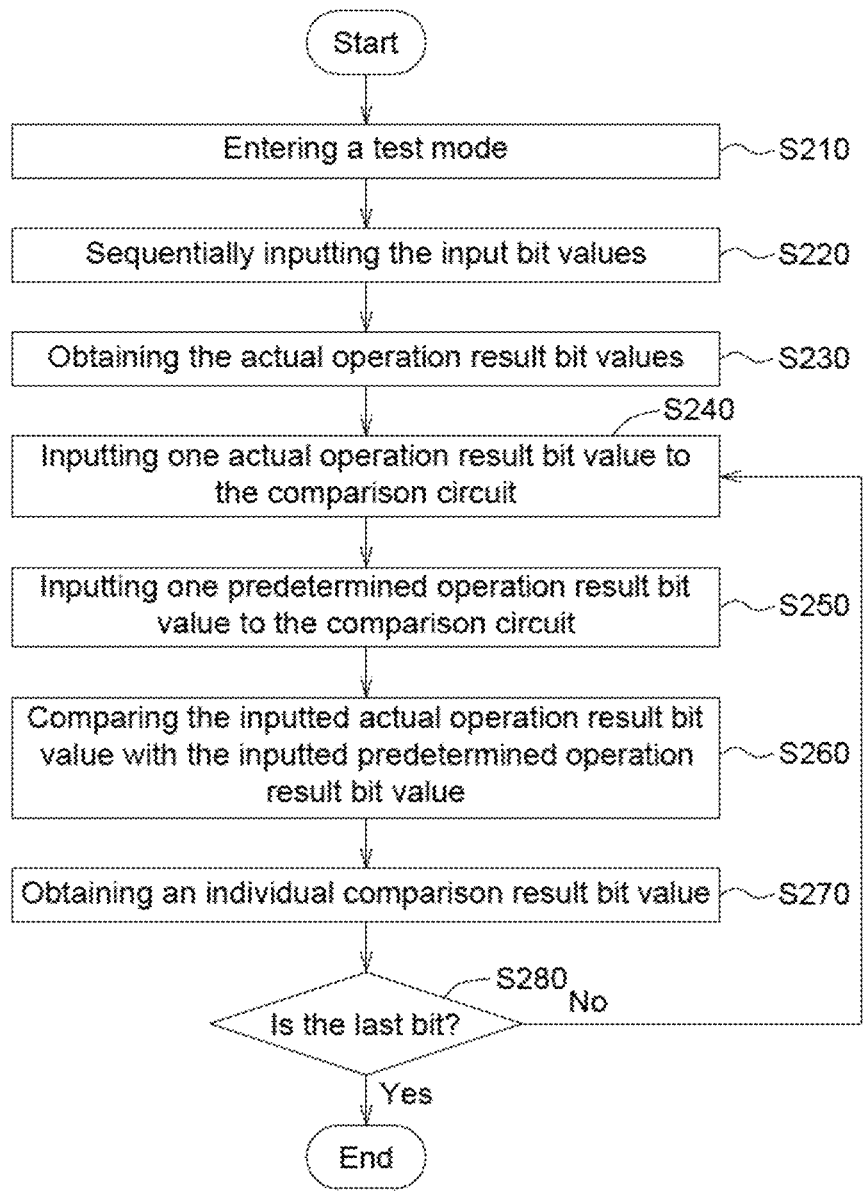
FIG. 7 illustrates a schematic diagram of a checker scan flip-flop (checker SFF) according to an embodiment of the present disclosure.
Figure 8:
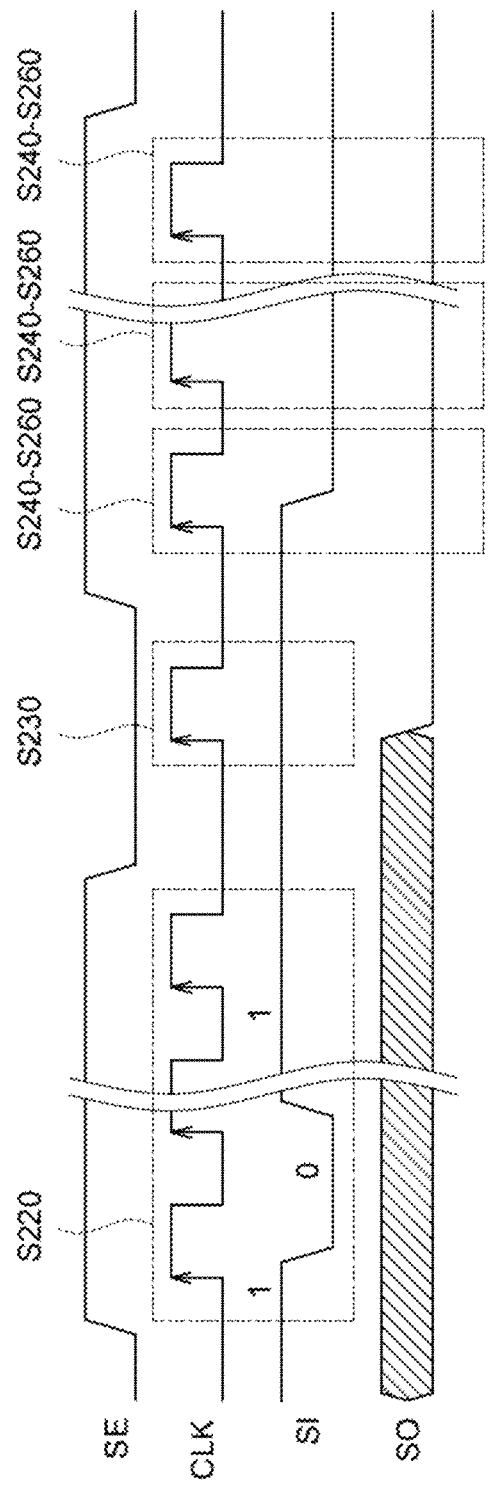
FIG. 8 illustrates a schematic diagram of a scan chain unit of a scan chain circuit according to another embodiment of the present disclosure.

Please refer to FIGS. 7 and 8. FIG. 7 illustrates a flow chart of an operation method of the scan chain circuit 200 according to an embodiment of the present disclosure. FIG. 8 shows a sequence diagram of the steps in the FIG. 7. The operation method of the chain circuit 200 includes steps S210 to S280. In the step S210, the scan chain circuit 200 is controlled to enter a test mode.

Then, in the step S220, the input bit values S_si are sequentially inputted to the input ends SI of the input scan flip-flops SFF2. As shown in FIG. 8, the three input bit values S_si are, for example, "1", "0", and "1". At this time, the select ends SE are pulled up to a high voltage, so that the input bit values S_si at the input ends SI could be inputted. After three rising-edge-triggers of the clock signal CLK, the three input bit values S_si will be pushed into the three input scan flip-flops SFF2.

Next, in the step S230, the input bit values S_si are operated by the logic circuit 900 to obtain the actual operation result bit values S_op at the output ends Q of the input scan flip-flops SFF2. At this time, the select ends SE are pulled down, such that the logic circuit 900 connected to the input ends D could perform the operation.

Then, in the step S240, one actual operation result bit value S_op is inputted to the comparison circuit CR2.

Next, in the step S250, one predetermined operation result bit value S_gd is inputted to the comparison circuit CR2.

During the step S240 and the step S250, the select ends SE are pulled up to a high voltage, so that the predetermined operation result bit values S_gd at the input end SI can be pushed into the input scan flip-flops SFF2 and the comparison circuit CR2. At the same time, the actual operation result bit values S_op at the input scan flip-flops SFF2 will also be pushed into the comparison circuit CR2.

Then, in the step S260, the comparison circuit CR2 compares the inputted actual operation result bit value S_op with the inputted predetermined operation result bit value S_gd.

Next, in the step S270, the comparison circuit CR2 obtains an individual comparison result bit value S_soi.

Then, in the step S280, whether it is the last bit is determined. If it is not the last digit, the process will return to the step S240; if it is the last digit, the process will be terminated. That is to say, the steps S240 to S260 will be executed repeatedly until all bits are compared in the comparison circuit CR2.

In the operation method of the scan chain circuit 200 in the embodiment of the FIG. 7, the actual operation result bit values S_op are not outputted directly, but after internal comparison, the individual comparison result bit values S_soi of "1" or "0" are output. In this way, even if a hacker steals the individual comparison result bit values S_soi, the contents of the logic circuit 900 cannot be deduced, nor can any user information be obtained.

Figure 9:
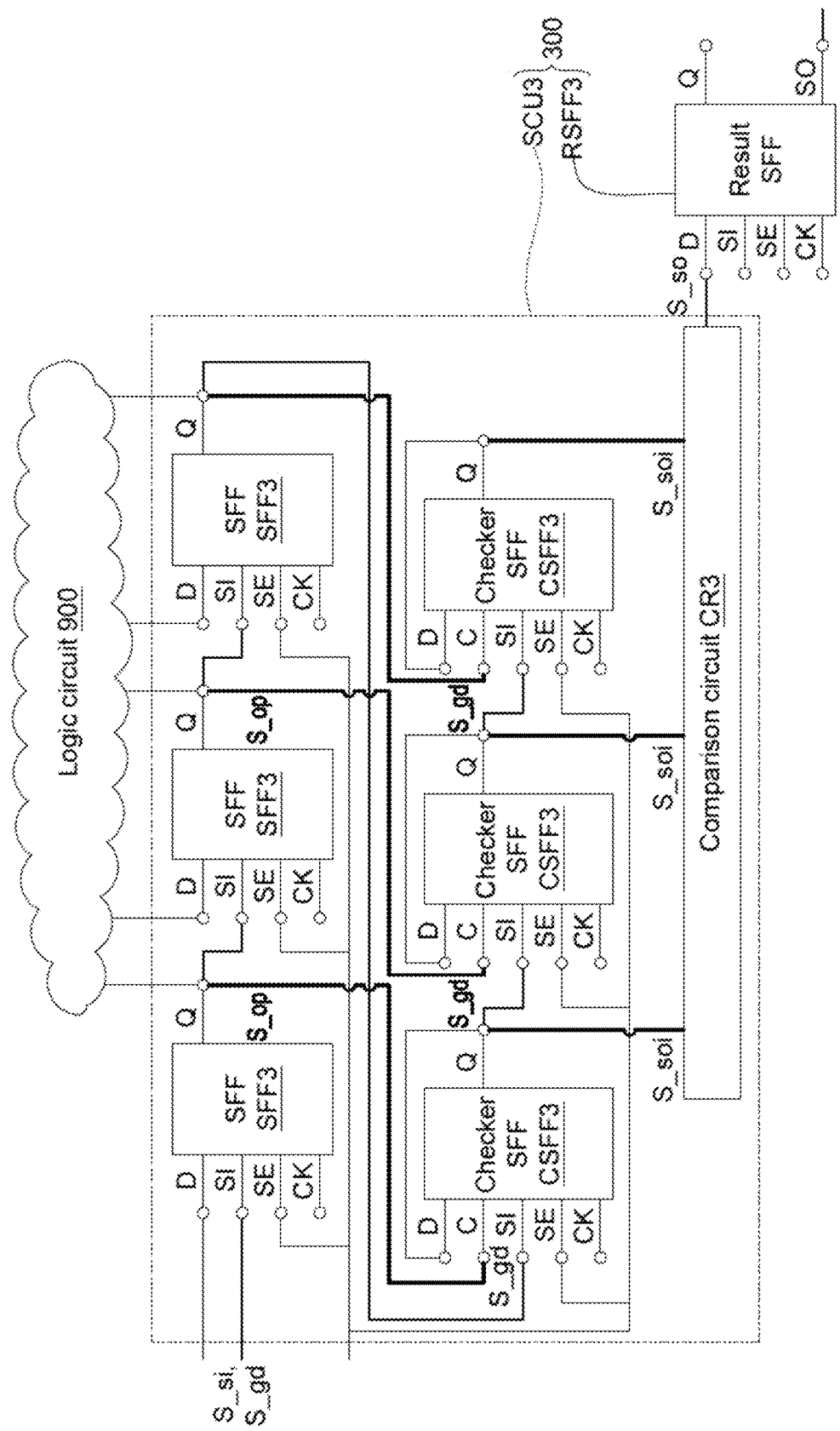
FIG. 9 illustrates a flow chart of an operation method of the scan chain circuit according to an embodiment of the present disclosure.

Please refer to FIG. 9, which illustrates a schematic diagram of a scan chain unit SCU3 of a scan chain circuit 300 according to another embodiment of the present disclosure. The scan chain circuit 300 includes a plurality of scan chain units SCU3 and a plurality of result scan flip-flops (Result SFF) RSFF3. The FIG. 9 only shows one scan chain unit SCU3 and one result scan flip-flop RSFF3.

As shown in the FIG. 9, each of the scan chain units SCU3 includes a plurality of input scan flip-flops (SFF) SFF3, a plurality of checker scan flip-flops (Checker SFF) CSFF3 and a comparison circuit CR3 (for example, an AND gate circuit). In the embodiment of the FIG. 9, the number of checker scan flip-flops CSFF3 is the same as the number of input scan flip-flops SFF3.

Figure 10:
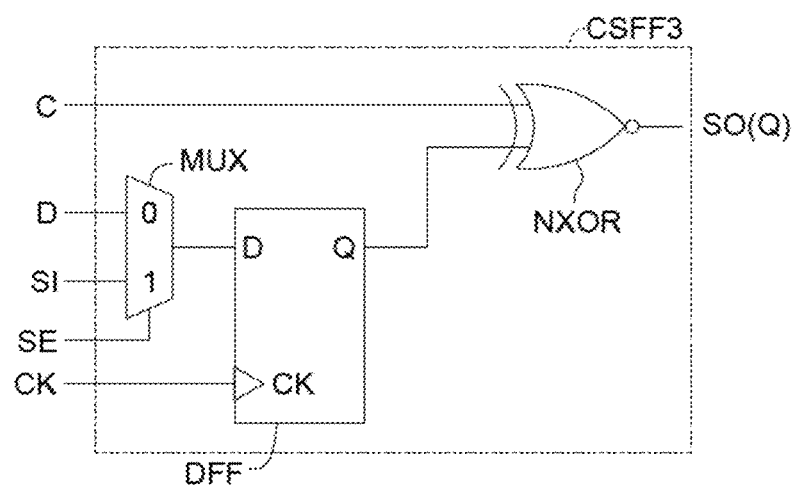
FIG. 10 shows a sequence diagram of the steps in the FIG. 9.

Please refer to FIG. 10, which illustrates a schematic diagram of the checker scan flip-flop (Checker SFF) CSFF3 according to an embodiment of the present disclosure. The checker scan flip-flop CSFF3 includes a D-type flip-flop DFF, a multiplexer MUX and an Exclusive NOR gate XNOR. The D-type flip-flop DFF has an input end D, a clock receiving end CK and an output end Q. The input end D of the D-type flip-flop DFF is connected to the multiplexer MUX. The multiplexer MUX selects the input end D or the input end SI to receive signals through the select end SE. The Exclusive NOR gate XNOR is connected to a check end C and the output end Q of the D-type flip-flop DFF to compare whether two signals are the same.

The circuit structure of the input scan flip-flop SFF3 is the same as that of the aforementioned input scan flip-flop SFF1, and will not be described again here.

As shown in the FIG. 9, the input scan flip-flops SFF3 are connected in series. That is to say, the output end Q of the previous input scan flip-flop SFF3 is connected to the input end SI of the next input scan flip-flop SFF3. The input ends D of the input scan flip-flops SFF3 are connected to the logic circuit 900.

The checker scan flip-flops CSFF3 are concatenated in series. That is to say, the output end Q of the previous checker scan flip-flop CSFF3 is connected to the input end SI of the next checker scan flip-flop CSFF3. The check ends C of the checker scan flip-flops CSFF3 are connected to the output ends Q of the input scan flip-flops SFF3.

The checker scan flip-flops CSFF3 are concatenated behind the input scan flip-flops SFF3. That is to say, the output end Q of the last input scan flip-flop SFF3 is connected to the input end SI of the first checker scan flip-flop CSFF3.

As shown in FIG. 9, three predetermined operation result bit values S_gd and three input bit values S_si are inputted sequentially from the input end SI of the first input scan flip-flop SFF3. After six rising-edge-triggers of the clock signal CLK, the three predetermined operation result bit values S_gd and the three input bit values S_si will be pushed into the three checker scan flip-flop CSFF3 and the three input scan flip-flop SFF3 respectively.

The input bit value S_si is, for example, "0" or "1". After the input bit values S_si are operated by the logic circuit 900, a plurality of actual operation result bit values S_op will be obtained at the output ends Q of the three input scan flip-flops SFF3.

Each of the predetermined operation result bit values S_gd is each of the predetermined operation results of each of the input bit values S_si after being operated by the logic circuit 900.

The output ends Q of the input scan flip-flops SFF3 are respectively connected to the check ends C of the checker scan flip-flops CSFF3, so as to output individual comparison result bit values S_soi from the output ends Q of the checker scan flip-flops CSFF3 respectively. Each of the individual comparison result bit values S_soi is a comparison result of one of the actual operation result bit values S_op and one of the predetermined operation result bit values S_gd corresponding thereto. If the actual operation result bit value S_op and the predetermined operation result bit value S_gd are equal, then the individual comparison result bit value S_soi is "1"; if the actual operation result bit value S_op and the predetermined operation result bit value S_gd are not equal, the individual comparison result bit value S_soi is "0".

Or, in another embodiment, if the actual operation result bit value S_op and the predetermined operation result bit value S_gd are equal, then the individual comparison result bit value S_soi is "0"; if the actual operation result bit value S_op and the predetermined operation result bit value S_gd are not equal, the individual comparison result bit value S_soi is "1".

As shown in FIG. 9, the comparison circuit CR3 simultaneously receives the individual comparison result bit values S_soi outputted from the output ends Q of the checker scan flip-flops CSFF3, and performs an AND logical comparison to output the bits comparison result bit value S_so.

In the embodiment shown in FIG. 9, the scan chain unit SCU3 does not directly output the actual operation result bit values S_op, but outputs the bits comparison result bit value S_so after internal comparison. In this way, even if a hacker steals the bits comparison result bit value S_so, the contents of the logic circuit 900 cannot be deduced, nor can any user information be obtained.

Figure 11:
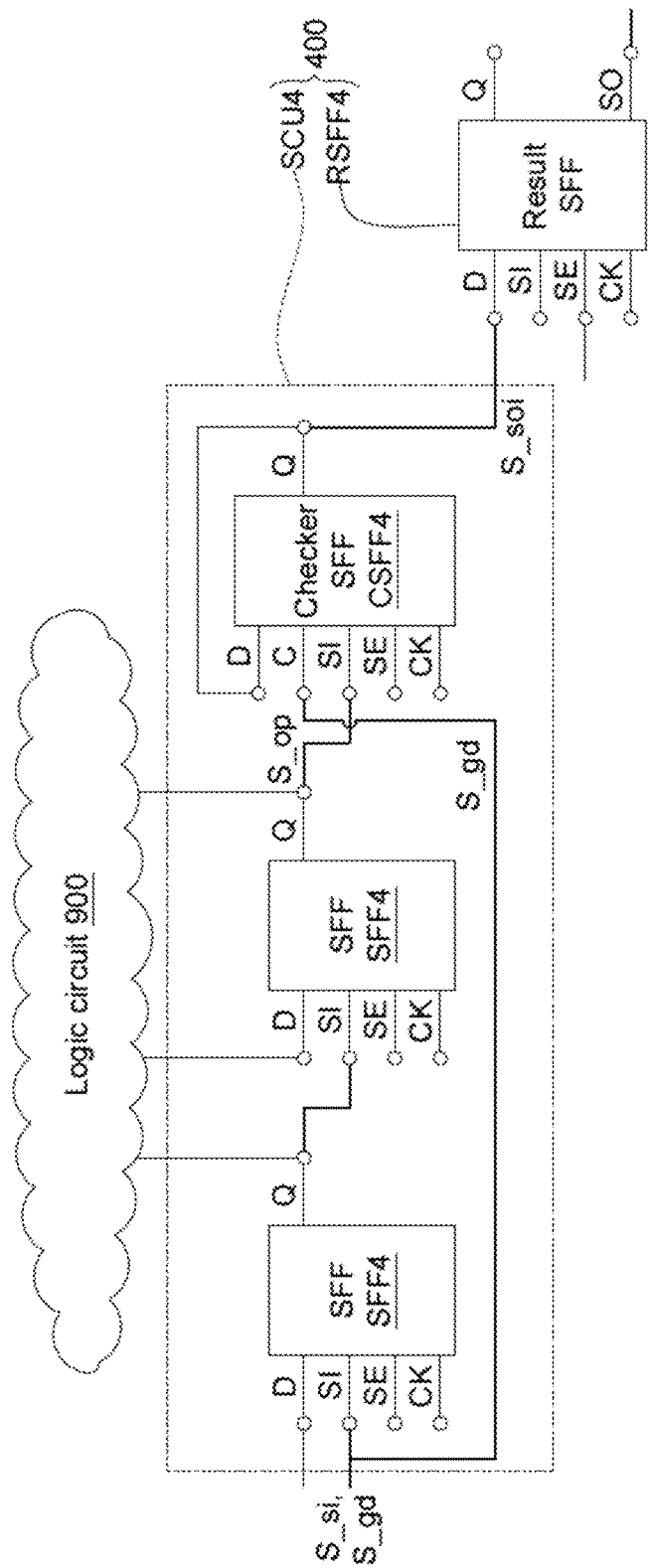
FIG. 11 illustrates a schematic diagram of a scan chain unit of a scan chain circuit according to another embodiment of the present disclosure.

Please refer to FIG. 11, which illustrates a schematic diagram of a scan chain unit SCU4 of a scan chain circuit 400 according to another embodiment of the present disclosure. The scan chain circuit 400 includes a plurality of scan chain units SCU4 and a plurality of result scan flip-flops (Result SFF) RSFF4. The FIG. 11 only shows one scan chain unit SCU4 and one result scan flip-flop RSFF4.

As shown in the FIG. 11, each of the scan chain units SCU4 includes a plurality of input scan flip-flops (SFF) SFF4 and a checker scan flip-flop (Checker SFF) CSFF4.

The circuit structure of the input scan flip-flop SFF4 is the same as the aforementioned input scan flip-flop SFF1, and will not be described again here. The circuit structure of the checker scan flip-flop CSFF4 is the same as that of the aforementioned checker scan flip-flop CSFF2, and will not be described again here.

As shown in the FIG. 11, the input scan flip-flops SFF4 are connected in series. That is to say, the output end Q of the previous input scan flip-flop SFF4 is connected to the input end SI of the next input scan flip-flop SFF4. The input ends D of the input scan flip-flops SFF4 are connected to the logic circuit 900.

The checker scan flip-flop CSFF4 is connected behind the input scan flip-flops SFF4. That is to say, the output end Q of the last input scan flip-flop SFF4 is connected to the input end SI of the checker scan flip-flop CSFF4. The check end C of the checker scan flip-flop CSFF4 is connected to the input end SI of the first input scan flip-flop SFF4.

As shown in the FIG. 11, two input bit values S_si are inputted sequentially from the input end SI of the first input scan flip-flop SFF4. After two rising-edge-triggers of the clock signal CLK, the two input bit values S_si will be pushed into the two input scan flip-flops SFF4 respectively.

The input bit value S_si is, for example, "0" or "1". After the input bit values S_si are operated by the logic circuit 900, a plurality of actual operation result bit values S_op will be obtained at the output ends Q of the two input scan flip-flops SFF4.

Then, two predetermined operation result bit values S_gd are inputted sequentially to the input end SI of the first input scan flip-flop SFF4. Each of the predetermined operation result bit values S_gd is each of the predetermined operation results of each of the input bit values S_si after being operated by the logic circuit 900.

The checker scan flip-flop CSFF4 sequentially receives the actual operation result bit value S_op outputted from the output end Q of the last input scan flip-flop SFF4 and the predetermined operation result bit values S_gd inputted from the input end SI of the first input scan flip-flop SFF4.

For example, after every rising-edge-trigger of the clock signal CLK, one predetermined operation result bit value S_gd and one actual operation result bit value S_op will be pushed into the checker scan flip-flop CSFF4, so that the output end Q of the checker scan flip-flop CSFF4 outputs one individual comparison result bit value S_soi. If the actual operation result bit value S_op and the predetermined operation result bit value S_gd are equal, then the individual comparison result bit value S_soi is "1"; if the actual operation result bit value S_op and the predetermined operation result bit value S_gd are not equal, the individual comparison result bit value S_soi is "0".

In the embodiment shown in the FIG. 11, the scan chain unit SCU4 does not directly output the actual operation result bit values S_op, but outputs the individual comparison result bit values S_soi after internal comparison. In this way, even if a hacker steals the individual comparison result bit values S_soi, the contents of the logic circuit 900 cannot be deduced, nor can any user information be obtained.

Figure 12:
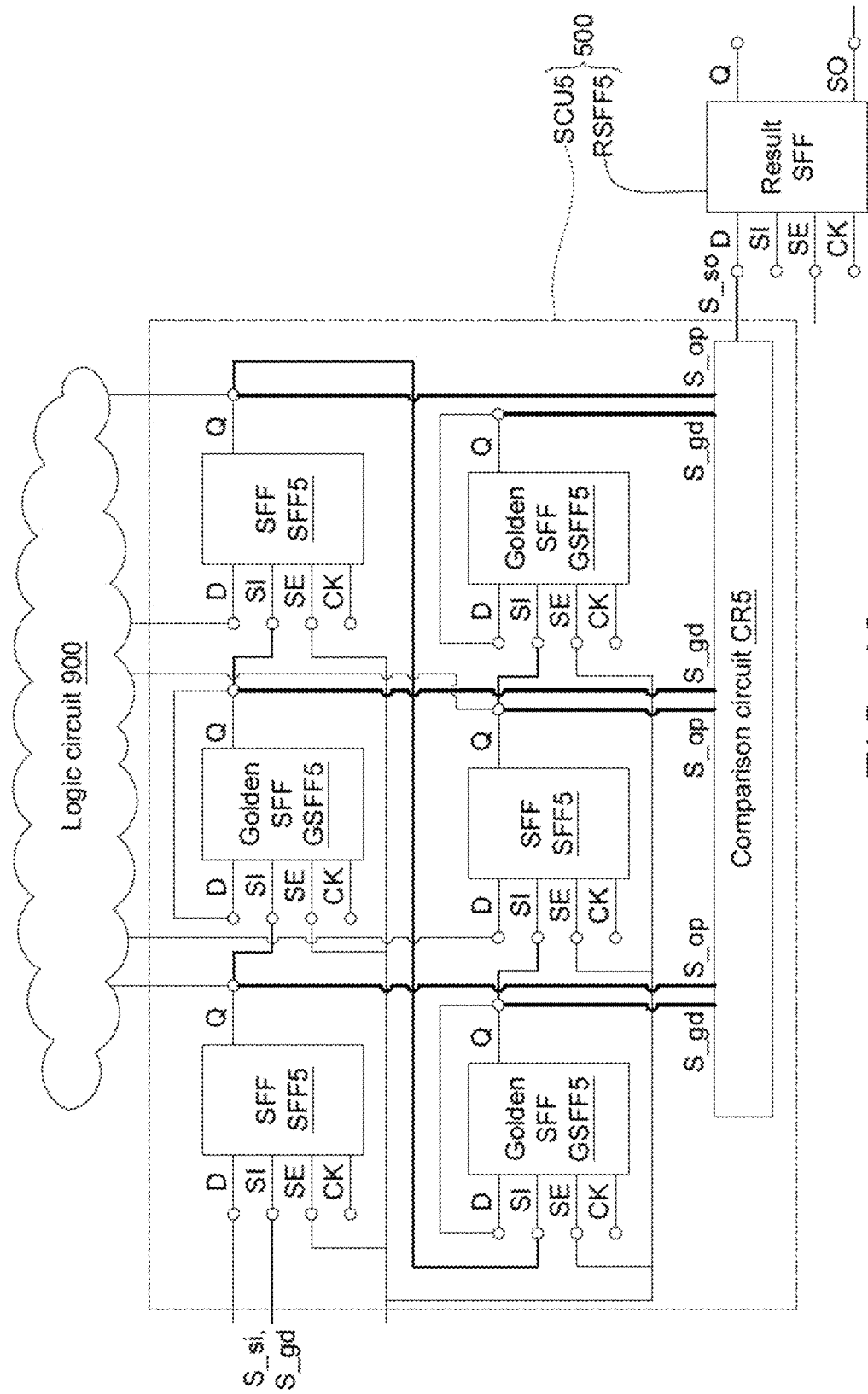
FIG. 12 illustrates a schematic diagram of a scan chain unit of a scan chain circuit according to another embodiment of the present disclosure.

Please refer to FIG. 12, which illustrates a schematic diagram of a scan chain unit SCU5 of a scan chain circuit 500 according to another embodiment of the present disclosure. The scan chain circuit 500 includes a plurality of scan chain units SCU5 and a plurality of result scan flip-flops (Result SFF) RSFF5. The FIG. 12 only shows one scan chain unit SCU5 and one result scan flip-flop RSFF5.

As shown in the FIG. 12, each of the scan chain units SCU5 includes a plurality of input scan flip-flops (SFF) SFF5, a plurality of golden scan flip-flops (Golden SFF) GSFF5 and a comparison circuit CR5. In the embodiment of the FIG. 12, the number of the golden scan flip-flops GSFF5 is the same as the number of the input scan flip-flops SFF5.

The circuit structure of the input scan flip-flop SFF5 and the golden scan flip-flop GSFF5 is the same as that of the input scan flip-flop SFF1, and will not be described again here.

The input scan flip-flops SFF5 and the golden scan flip-flops GSFF5 are interleaved and connected in series. That is to say, the output end Q of the previous input scan flip-flop SFF5 is connected to the input end SI of the next golden scan flip-flop GSFF5, and the output end Q of the previous golden scan flip-flop GSFF5 is connected to the input end SI of the next input scan flip-flop SFF5. The input ends D of the input scan flip-flops SFF5 are connected to the logic circuit 900.

As shown in the FIG. 12, three predetermined operation result bit values S_gd and three input bit values S_si are alternately inputted to the input end SI of the first input scan flip-flop SFF1. After six rising-edge-triggers of the clock signal CLK, the three predetermined operation result bit values S_gd and the three input bit values S_si will be pushed into the three golden scan flip-flops GSFF5 and the three input scan flip-flops SFF5 respectively.

The input bit value S_si is, for example, "0" or "1". After the input bit values S_si are operated by the logic circuit 900, a plurality of actual operation result bit values S_op will be obtained at the output ends Q of the three input scan flip-flops SFF5.

Each of the predetermined operation result bit values S_gd is each of the predetermined operation results of each of the input bit values S_si after being operated by the logic circuit 900.

The output ends Q of the input scan flip-flops SFF5 and the output ends Q of the golden scan flip-flops GSFF5 are connected to the comparison circuit CR5. The comparison circuit CR5 could receive the actual operation result bit values S_op and the predetermined operation result bit values S_gd. The comparison circuit CR5 compares the actual operation result bit values S_op and the predetermined operation result bit values S_gd, then outputs the bits comparison result bit value S_so.

As shown in the FIG. 12, the comparison circuit CR5 simultaneously receives the actual operation result bit values S_op outputted from the output ends Q of the input scan flip-flops SFF5 and the predetermined operation result bit values S_gd outputted from the output ends Q of the golden scan flip-flops GSFF5 and compare them at the same time.

The bits comparison result bit value S_so is, for example, "0" or "1". "0" indicates that at least one of the actual operation result bit values S_op is different from the corresponding predetermined operation result bit value S_gd; "1" means that all of the actual operation result bit values S_op and all of the predetermined operation result bit values S_gd corresponding thereto are the same "1".

In the embodiment shown in the FIG. 12, the scan chain unit SCU1 does not directly output the actual operation result bit values S_op, but outputs the bits comparison result bit value S_so after internal comparison. In this way, even if a hacker steals the bits comparison result bit value S_so, the contents of logic circuit 900 cannot be deduced, nor can any user information be obtained.

Figure 13:
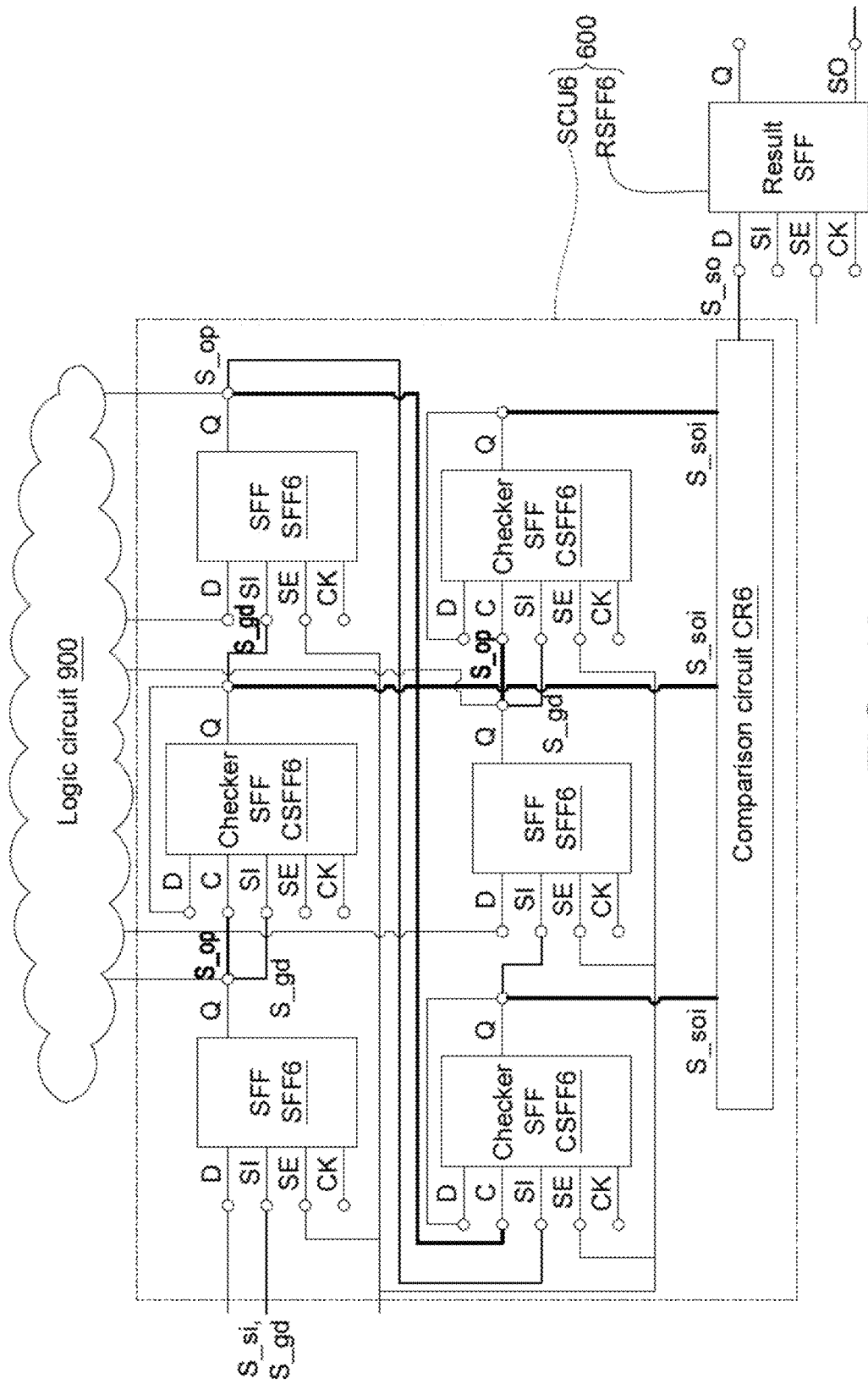
FIG. 13 illustrates a schematic diagram of a scan chain unit of a scan chain circuit according to another embodiment of the present disclosure.

Please refer to FIG. 13, which illustrates a schematic diagram of a scan chain unit SCU6 of a scan chain circuit 600 according to another embodiment of the present disclosure. The scan chain circuit 600 includes a plurality of scan chain units SCU6 and a plurality of result scan flip-flops (Result SFF) RSFF6. The FIG. 13 only shows one scan chain unit SCU6 and one result scan flip-flop RSFF6.

As shown in the FIG. 13, each of the scan chain units SCU6 includes a plurality of input scan flip-flops (SFF) SFF6, a plurality of checker scan flip-flops (Checker SFF) CSFF6 and a comparison circuit CR6 (for example, an AND gate circuit). In the embodiment of the FIG. 13, the number of the checker scan flip-flops CSFF6 is the same as the number of the input scan flip-flops SFF6.

The circuit structure of the input scan flip-flop SFF6 is the same as that of the aforementioned input scan flip-flop SFF1, and will not be described again here. The circuit structure of checker scan flip-flop CSFF6 is the same as that of the aforementioned checker scan flip-flop CSFF2, and will not be described again here.

The input scan flip-flops SFF6 and the checker scan flip-flops CSFF6 are interleaved and connected in series. That is to say, the output end Q of the previous input scan flip-flop SFF6 is connected to the input end SI of the next checker scan flip-flop CSFF6, and the output end Q of the previous checker scan flip-flop CSFF6 is connected to the next input scan flip-flop input end SI of SFF6. The input ends D of the input scan flip-flops SFF6 are connected to the logic circuit 900.

As shown in the FIG. 13, three predetermined operation result bit values S_gd and three input bit values S_si are alternately inputted to the input end SI of the first input scan flip-flop SFF6. After six rising-edge-triggers of the clock signal CLK, the three predetermined operation result bit values S_gd and the three input bit values S_si will be pushed into the three checker scan flip-flops CSFF6 and the three input scan flip-flops SFF6 respectively.

The input bit value S_si is, for example, "0" or "1". After the input bit values S_si are operated by the logic circuit 900, a plurality of actual operation result bit values S_op will be obtained at the output ends Q of the three input scan flip-flops SFF1.

Each of the predetermined operation result bit values S_gd is each of the predetermined operation results of each of the input bit values S_si after being operated by the logic circuit 900.

The output ends Q of the input scan flip-flops SFF6 are respectively connected to a plurality of check ends C of the checker scan flip-flops CSFF6, so as to output a plurality of individual comparison result bit values S_soi respectively from the output ends Q of the checker scan flip-flops CSFF6. Each of the individual comparison result bit values S_soi is the comparison result of one actual operation result bit value S_op and one predetermined operation result bit value S_gd corresponding thereto. If the actual operation result bit value S_op and the predetermined operation result bit value S_gd are equal, then the individual comparison result bit value S_soi is "1"; if the actual operation result bit value S_op and the predetermined operation result bit value S_gd are not equal, the individual comparison result bit value S_soi is "0".

Or, in another embodiment, if the actual operation result bit value S_op and the predetermined operation result bit value S_gd are equal, then the individual comparison result bit value S_soi is "0"; if the actual operation result bit value S_op and the predetermined operation result bit value S_gd are not equal, the individual comparison result bit value S_soi is "1".

As shown in the FIG. 13, the comparison circuit CR6 simultaneously receives the individual comparison result bit values S_soi outputted from the output ends Q of the checker scan flip-flops CSFF6, and performs an AND logical comparison to output the bits comparison result bit value S_so.

In the embodiment shown in the FIG. 13, the scan chain unit SCU6 does not directly output the actual operation result bit values S_op, but outputs the bits comparison result bit value S_so after internal comparison. In this way, even if a hacker steals the bits comparison result bit value S_so, the contents of logic circuit 900 cannot be deduced, nor can any user information be obtained.

The above disclosure provides various features for implementing some implementations or examples of the present disclosure. Specific examples of components and configurations (such as numerical values or names mentioned) are described above to simplify/illustrate some implementations of the present disclosure. Additionally, some embodiments of the present disclosure may repeat reference symbols and/or letters in various instances. This repetition is for simplicity and clarity and does not inherently indicate a relationship between the various embodiments and/or configurations discussed.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A scan chain circuit, used for testing a logic circuit, wherein the scan chain circuit comprises:
    a plurality of scan chain units, each including:
        a plurality of scan flip-flop (SFF), for receiving a plurality of input bit values, wherein after the input bit values are operated by the logic circuit, a plurality of actual operation result bit values are obtained; and
        a comparison circuit, for receiving the actual operation result bit values and a plurality of predetermined operation result bit values, wherein each of the predetermined operation result bit values is each of a plurality of predetermined operation results after each of the input bit values is operated by the logic circuit, the comparison circuit compares the actual operation result bit values and the predetermined operation result bit values, and then outputs a bits comparison result bit value.

2. The scan chain circuit according to claim 1, wherein each of the scan chain units further comprises:
    a plurality of golden scan flip-flops (golden SFF), wherein the input scan flip-flops are concatenated in series, the golden scan flip-flops are concatenated in series, and the golden scan flip-flops are concatenated behind the input scan flip-flops.

3. The scan chain circuit according to claim 2, wherein a plurality of output ends of the input scan flip-flops and a plurality of output ends of the golden scan flip-flops are connected to the comparison circuit.

4. The scan chain circuit according to claim 3, wherein the comparison circuit simultaneously receives the actual operation result bit values outputted from the output ends of the input scan flip-flops and the predetermined operation result bit values outputted from the output ends of the golden scan flip-flops.

5. The scan chain circuit according to claim 1, further comprising:
a plurality of result scan flip-flops, the result scan flip-flops are respectively connected to the scan chain units, the result scan flip-flops are connected in series.

6. The scan chain circuit according to claim 1, wherein each of the scan chain units further comprises:
a plurality of checker scan flip-flops (checker SFF), the input scan flip-flops are connected in series, the checker scan flip-flops are connected in series, and the checker scan flip-flops are concatenated behind the input scan flip-flops.

7. The scan chain circuit according to claim 6, wherein a plurality of output ends of the input scan flip-flops are respectively connected to a plurality of check ends of the checker scan flip-flops, such that a plurality of output ends of the checker scan flip-flops output a plurality of individual comparison result bit values respectively.

8. The scan chain circuit according to claim 7, wherein the comparison circuit simultaneously receives the individual comparison result bit values outputted from the output ends of the checker scan flip-flops.

9. The scan chain circuit according to claim 1, wherein the input scan flip-flops are connected in series, and a last one of the output ends of the input scan flip-flops is connected to the comparison circuit, a first one of the input ends of the input scan flip-flops is connected to the comparison circuit.

10. The scan chain circuit according to claim 1, wherein the comparison circuit sequentially receives the actual operation result bit values outputted from the last one of the output ends of the input scan flip-flops connected in series and the predetermined operation result bit values outputted from the first one of the input ends of the input scan flip-flops connected in series.

11. The scan chain circuit according to claim 1, wherein each of the scan chain units further comprises:
a plurality of golden scan flip-flops (Golden SFF), wherein the input scan flip-flops and the golden scan flip-flops are interleaved and connected in series.

12. The scan chain circuit according to claim 11, wherein the output ends of the plurality input scan flip-flops and the output ends of the golden scan flip-flops are directly connected to the comparison circuit.

13. The scan chain circuit according to claim 12, wherein the comparison circuit simultaneously receives the actual operation result bit values outputted from the output ends of the input scan flip-flops and the predetermined operation result bit values outputted from the output ends of the golden scan flip-flops.

14. The scan chain circuit according to claim 1, wherein each of the scan chain units further comprises:
a plurality of checker scan flip-flops (Checker SFF), wherein the input scan flip-flops and the checker scan flip-flops are interleaved and connected in series.

15. The scan chain circuit according to claim 14, wherein the output ends of the input scan flip-flops are respectively connected to the check ends of the checker scan flip-flops, such that a plurality of output ends of the checker scan flip-flops output a plurality of individual comparison result bit values respectively.

16. The scan chain circuit according to claim 15, wherein the comparison circuit receives the individual comparison result bit values outputted from the output ends of the checker scan flip-flops.

17. A scan chain circuit, used for testing a logic circuit, wherein the scan chain circuit comprises:
a plurality of scan chain units, wherein each of the scan chain units comprises:
a plurality of input scan flip-flop (SFF), wherein the input scan flip-flops are used to receive a plurality of input bit values, and after the input bit values are operated by the logic circuit, a plurality of actual operation result bit values are obtained; and
at least one checker scan flip-flop (Checker SFF), used for receiving the actual operation result bit values and a plurality of predetermined operation result bit values, wherein each of the predetermined operation result bit values is each of a plurality of predetermined operation results of each of the input bit values operated by the logic circuit, the at least one checker scan flip-flop compares the actual operation result bit values and the predetermined operation result bit values, and then outputs a plurality of individual comparison result bit values.

18. The scan chain circuit according to claim 17, wherein the input scan flip-flops are concatenated in series, and a last one of the output ends of the concatenated input scan flip-flops is connected to the at least one checker scan flip-flop.

19. The scan chain circuit according to claim 17, wherein the at least one checker scan flip-flop sequentially receives the actual operation result bit values outputted from a last one of the output ends of the concatenated input scan flip-flops and the predetermined operation result bit values outputted from a first one of the input ends of the input scan flip-flops.

20. An operation method of a scan chain circuit, comprises:
controlling the scan chain circuit to be enter a test mode;
sequentially inputting a plurality of input bit values to a plurality of input ends of a plurality of input scan flip-flops (SFF);
operating the input bit values by a logic circuit to obtain a plurality of actual operation result bit values at the output ends of the input scan flip-flops;
inputting one of the actual operation result bit values to a comparison circuit;
inputting one of the predetermined operation result bit values to the comparison circuit; and
comparing the actual operation result bit value, which is inputted, with the predetermined operation result bit value, which is inputted, using the comparison circuit to obtain an individual comparison result bit value;
wherein inputting one of the actual operation result bit values to the comparison circuit, inputting one of the predetermined operation result bit values to the comparison circuit, and comparing the actual operation result bit value, which is inputted, with the predetermined operation result bit value, which is inputted, using the comparison circuit are performed repeatedly.

* * * * *